United States Patent
Park et al.

(10) Patent No.: US 7,913,207 B2
(45) Date of Patent: Mar. 22, 2011

(54) METHOD AND APPARATUS FOR VERIFYING LOGIC CIRCUIT

(75) Inventors: Sang-ho Park, Gunpo-si (KR); Jong-bae Lee, Yongin-si (KR); Moon-hyun Yoo, Suwon-si (KR); Ho Shim, Suwon-si (KR); Jin-won Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 441 days.

(21) Appl. No.: 11/649,628

(22) Filed: Jan. 4, 2007

(65) Prior Publication Data

US 2007/0168896 A1 Jul. 19, 2007

(30) Foreign Application Priority Data

Jan. 17, 2006 (KR) .................. 10-2006-0004878

(51) Int. Cl.
*G06F 17/50* (2006.01)
*G06F 9/455* (2006.01)
*G06F 11/22* (2006.01)

(52) U.S. Cl. ........ 716/106; 716/108; 716/111; 716/136; 703/13; 703/14

(58) Field of Classification Search .................. 716/4–5; 703/13–14
See application file for complete search history.

(56) References Cited

U.S. PATENT DOCUMENTS

| 5,388,215 | A | * | 2/1995 | Baker et al. ................... 709/229 |
| 5,687,094 | A | | 11/1997 | Kagawa et al. |
| 6,671,846 | B1 | * | 12/2003 | Schultz ........................ 714/741 |
| 6,675,310 | B1 | * | 1/2004 | Bloom et al. ................. 713/500 |
| 6,802,046 | B2 | * | 10/2004 | Coelho et al. ..................... 716/4 |
| 6,915,249 | B1 | | 7/2005 | Sato et al. |
| 2002/0049576 | A1 | * | 4/2002 | Meyer ............................ 703/14 |
| 2003/0208734 | A1 | * | 11/2003 | Coelho et al. ..................... 716/6 |
| 2005/0149312 | A1 | * | 7/2005 | McGaughy ...................... 703/14 |
| 2005/0268265 | A1 | * | 12/2005 | Ly et al. ........................... 716/6 |
| 2006/0271345 | A1 | * | 11/2006 | Kasuya .......................... 703/14 |
| 2007/0299647 | A1 | * | 12/2007 | Bolcato et al. ................. 703/14 |
| 2008/0027699 | A1 | * | 1/2008 | Wu et al. ......................... 703/14 |
| 2008/0134115 | A1 | * | 6/2008 | Ly et al. ........................... 716/5 |
| 2008/0216032 | A1 | * | 9/2008 | McElvain et al. ................ 716/5 |

FOREIGN PATENT DOCUMENTS

| KR | 10-0185796 | 5/1999 |
| KR | 1020050002497 A | 1/2005 |

* cited by examiner

*Primary Examiner* — Stacy A Whitmore
(74) *Attorney, Agent, or Firm* — Mills & Onello, LLP

(57) ABSTRACT

A method and an apparatus for verifying a logic circuit, capable of quicker operation, being applied to a logic gate-level or transistor-level circuit design, and verifying timing and analog signal characteristics of a signal. The logic circuit verification method includes a wave file generation stage and a logic circuit verification stage. The wave file generation stage generates a wave file that includes the waveforms of all nodes of the logic circuit using a design source file of the logic circuit. The stage of verification of the logic circuit verifies the logic circuit using a design reference file, which includes ideal operations of all the nodes of the logic circuit, and the wave file.

18 Claims, 3 Drawing Sheets

FIG. 4

| BLOCK | NUMBER OF VECTORS | NUMBER OF ASSERTIONS | COVERAGE (Oin, ADV) | TIME TAKEN (Oin, ADV) | INCREASE OF SPEED |
|---|---|---|---|---|---|
| COM3 | 67 | ABOUT 6800 | 61%, 58% | 19.5h, 1.8h | 10.8 TIMES |
| IL | 79 | ABOUT 6800 | 58%, 53% | 24h, 1.8h | 13.3 TIMES |

METHOD AND APPARATUS FOR VERIFYING LOGIC CIRCUIT

CROSS-REFERENCE TO RELATED PATENT APPLICATION

This application claims priority under 35 U.S.C. §119 to Korean Patent Application No. 10-2006-0004878, filed on Jan. 17, 2006, in the Korean Intellectual Property Office, the disclosure of which is incorporated herein in its entirety by reference.

BACKGROUND OF THE INVENTION

1. Field of the Invention

The present invention relates to circuit design, and more particularly, to a method and an apparatus for verifying logic and the representation of a circuit design in a front-end stage.

2. Description of the Related Art

The design of a semiconductor integrated circuit can be divided into a front-end design stage that includes logic design and circuit design, and a back-end design stage that includes layout design. In the front-end design stage, a designer designs a logic circuit using a hardware description language (hereinafter, referred to as HDL) and verifies the functions of the logic circuit using automatic design verification tools. After verifying the required functions of the logic circuit, the designer performs the back-end design stage, creating a gate level or transistor level circuit corresponding to the verified logic circuit designed with the HDL.

FIG. 1 is a block diagram showing the stages of designing a logic circuit using a conventional method.

Referring to FIG. 1, the design stages 100 of the logic circuit include a logic circuit design stage 110, a logic circuit verification stage 120, and a defect correction stage 130.

In the design stage 110, at least one of a register transfer level (RTL) source code, a gate level net-list, and a net-list for a simulation program with integrated circuit emphasis (hereinafter, referred to as SPICE) corresponding to the logic circuit to be designed is selected and generated.

The verification stage 120 verifies the function of the logic circuit, which is defined in the design stage 110 using a simulation method. Generally, an assertion-based verification (hereinafter, referred to as ABV) method is used to verify a logic circuit that is generated in RTL or HDL source code. The ABV inserts an assertion that calls an assertion specification macro module into the part of the HDL source code to be verified. Thereafter, a specification macro processor converts the assertion specification macro module into HDL code, and defects of the logic circuit including the HDL code of the converted macro module are detected using a logic simulator, such as a Verilog simulator. If the logic circuit is generated using a gate level net-list or SPICE net-list, the assertion-based verification method cannot be used, and the function of the logic circuit is verified using a different simulator apart from the assertion-based verification method.

Defects detected in the verification stage 120 are corrected by modifying the logic circuit 120 in the defect correction stage 130.

The verification stage 120 using the conventional ABV method illustrated in FIG. 1 has the following problems.

Although the ABV verification method is quite useful for HDL code-based circuit design, it cannot be used for designing a circuit at the logic gate or transistor level.

The assertion used in the ABV only verifies the function of the logic circuit, without considering the timing and analog signal characteristics.

Since the assertion specification macro module can be used only for a specific ABV logic simulator, the type of logic simulator which can be used is limited.

Since the ABV method is linked to the simulator, the verification takes a long time, because the assertion is inserted into many parts of the HDL source code, and the operations of the assertion must be performed in series.

SUMMARY OF THE INVENTION

In accordance with aspects of the present invention, provided is a method of verifying a logic circuit or logic circuit design, capable of verifying more quickly, being applied to a logic gate-level or transistor-level circuit design, and verifying timing and analog signal characteristics of the logic circuit.

In accordance with aspects of the present invention, also provided is an apparatus performing the method of verifying a logic circuit or logic circuit design.

According to an aspect of the present invention, there is provided a logic circuit verification method comprising: generating a wave file and verifying the logic circuit. In the generating of the wave file, a wave file including the waveforms of all nodes of the logic circuit is generated using a design source file representing the logic circuit. In the verifying of the logic circuit, the logic circuit is verified using a design reference file and the wave file, wherein the design reference file includes ideal operations to be implemented for all the nodes of the logic circuit.

The generating of the wave file can comprise generating the source file and outputting information on waveforms of each node of the logic circuit that are included in the source file.

The source file can be one of HDL code, a gate-level net-list, and a SPICE net-list.

The verifying of the logic circuit can comprise comparing each of the nodes included in the design reference file with a corresponding node included in the wave file, and storing a result of the comparison in an apparatus for defect storage.

The verifying of the logic circuit can comprise reading the design reference file; determining whether or not a node of the logic circuit from the design reference file corresponds to a node in the wave file; retrieving information on a waveform of the corresponding node from the wave file, when there the corresponding node exists in the wave file; determining the occurrence of a defect by comparing each node that has been retrieved from the design reference file with the corresponding node in the wave file; saving the defect in a storage device when the node that has been retrieved from the reference file does not correspond to a node in the wave file, or when a defect is found based on the result of the comparison; determining whether or not at least one node remains to be compared, when a defect is found and saved or no defect has been found based on the comparison result; and repeating all the operations above when a node remains to be compared.

The verifying of the logic circuit can comprise verifying functional, timing, and analog characteristics of all of the nodes of the logic circuit.

The verifying of the functional characteristics of a node in the logic circuit can include determining whether or not logical values at a predetermined point in time are within an allowed range specified by the design reference file, wherein the verifying of the timing characteristics of the node in the logic circuit includes determining whether or not a setup time, a hold time, and a propagation time of a signal are within allowed ranges specified by the design reference file, and wherein the verifying of the analog characteristics of the node in the logic circuit includes determining whether or not a duration time of the nodes' unknown state is within an allowed range specified by the design reference file.

When the verifying of the logic circuit results in determining a defect in a design of the logic circuit, the method can further comprise correcting the defect of the design in the logic circuit.

In accordance with another aspect of the present invention, provided is a logic circuit verification method, comprising: verifying functional, timing, and analog characteristics of each node of a logic circuit using waveforms resulting from a simulation of each node of the logic circuit and representations of ideal operations of each node of the logic circuit.

The verifying can include determining if there is a waveform corresponding to each node in the logic circuit, the absence of a waveform indicating a defect.

The waveforms can be stored in a wave file and the ideal operations of each node can be stored in a design reference file.

The verifying can comprise comparing information from the wave file with information from the design reference file.

According to another aspect of the present invention, there is provided an apparatus configured to verify a logic circuit. The apparatus verifies the logic circuit design by comparing waveform characteristics of nodes of the logic circuit design with ideal operations of the nodes of a logic circuit design.

The apparatus can be configured to verify functional, timing, and analog signal characteristics of the logic circuit using the waveform characteristics of each node of the logic circuit.

The waveform characteristics can be generated from a source file comprising one of HDL code, a gate-level net-list, and a SPICE net-list.

In accordance with another aspect of the invention, provided is an apparatus for verifying a logic circuit design. The apparatus comprises: a wave file generation stage configured to generate a source file representing the logic circuit design and to generate a wave file from the source file, the wave file comprising waveforms corresponding to nodes of the logic circuit design; and a logic circuit verification stage configured to verify the logic circuit design by comparing the waveforms corresponding to each of the nodes of the logic circuit design with a design reference file representing an ideal operation of each of the nodes of the logic circuit design.

The apparatus can further comprise a defect correction stage configured to correct defects in the logic circuit design detected during the verifying by the logic circuit verification stage.

The logic circuit verification stage can be configured to verify functional, timing, and analog signal characteristics of the logic circuit design using waveform characteristics in the wave file for each node of the logic circuit design.

The logic circuit verification stage can be configured to verify the logic circuit by comparing information in the wave file with information the reference design file.

The source file can be one of HDL code, a gate-level net-list, and a SPICE net-list.

BRIEF DESCRIPTION OF THE DRAWINGS

The above and other features and advantages of the present invention will become more apparent by describing in detail exemplary embodiments according to aspects of the invention with reference to the attached drawings, in which:

FIG. 4 is a table showing data resulting from the application of the conventional logic circuit verification method and the logic circuit verification method according to aspects of the present invention.

DETAILED DESCRIPTION OF THE INVENTION

Figure 1:
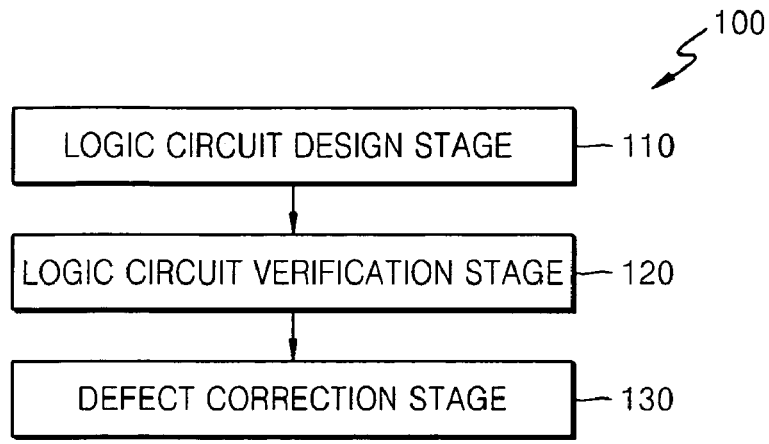
FIG. 1 is a block diagram showing the stages of designing a logic circuit using a prior art method.

Embodiments of the present invention will now be described in detail with reference to the accompanying drawings. Like reference numerals denote like elements in the drawings.

Figure 2:
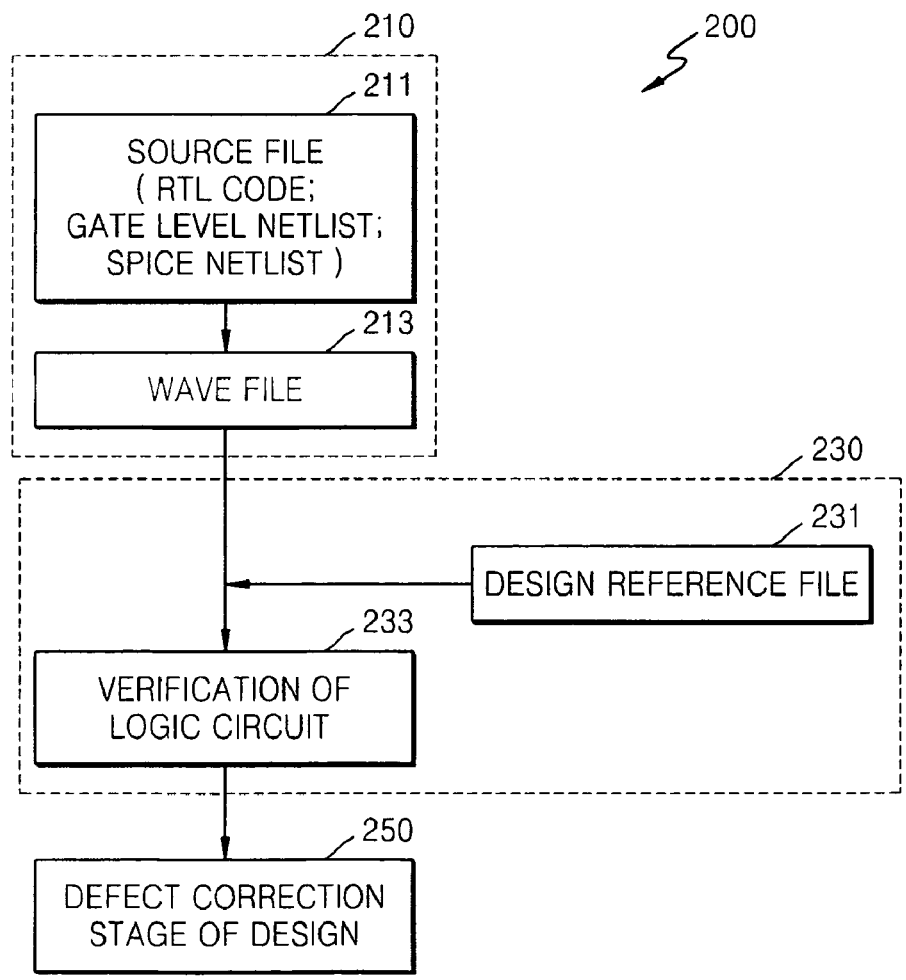
FIG. 2 is a block diagram showing an embodiment of a logic circuit verification method according to aspects of the present invention.

FIG. 2 is a block diagram showing an embodiment of a logic circuit verification method according to aspects of the present invention.

Referring to FIG. 2, the verification method includes a wave file generation stage 210, a logic circuit verification stage 230, and a design defect correction stage 250.

The wave file generation stage 210 generates a wave file 213 from a source file 211 that represents a logic circuit to be designed. The wave file 213 includes waveforms corresponding to each node of the logic circuit. The source file 211 of the logic circuit is one of an HDL code, a gate-level net-list, and a SPICE net-list, as examples. The wave file 213 can be obtained by inputting the source file 211 to a simulator. The type of simulator varies according to the type of source file 211, which are generally known in the art, so not discussed in detail herein.

The logic circuit verification stage 230 verifies the logic circuit (or logic circuit design) using a design reference file 231, which includes the ideal operation of all the nodes of the logic circuit and the wave file 213. The any node included in the design reference file 231 and the corresponding nodes included in the wave file 211 are compared respectively and the result of the comparison is stored in an apparatus for defect storage.

The logic circuit verification stage 230 will now be described with reference to FIG. 3.

Figure 3:
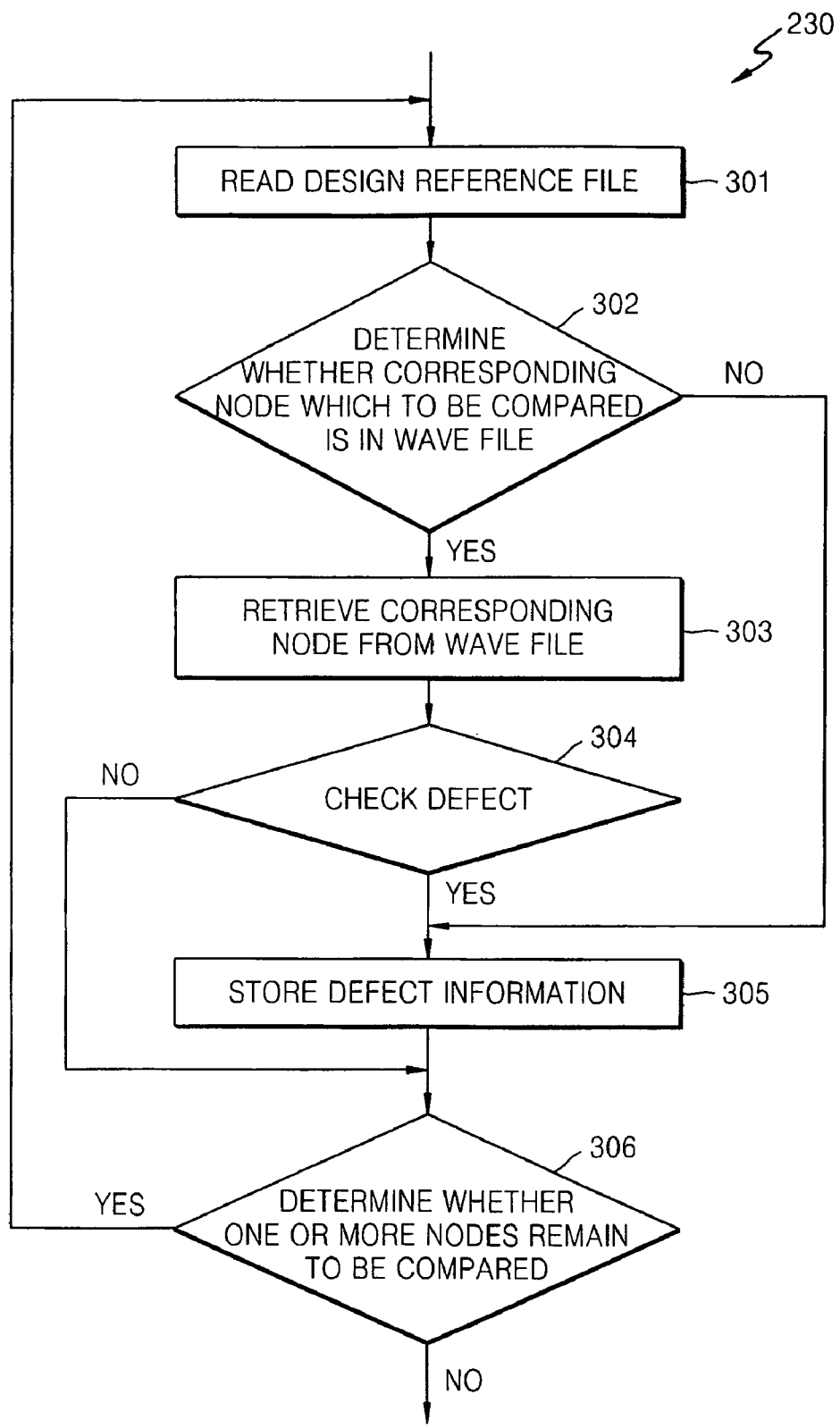
FIG. 3 is a flowchart illustrating an embodiment of a logic circuit verification stage of FIG. 2.

FIG. 3 is a flowchart illustrating the logic circuit verification stage 230 of FIG. 2.

Referring to FIG. 3, the logic circuit verification stage 230 begins with reading the design reference file 231, in step 301. Next, it is determined whether or not a node of the logic circuit that has been retrieved from the design reference file 231 corresponds to a node in the wave file 213, in step 302. If the corresponding node is in the wave file (i.e., the "YES" result), information on the waveform of that node is retrieved, in step 303. If the corresponding node is not in the wave file (i.e., the "NO" result), it is determined that there is a defect, and information on the defect is stored in the apparatus for defect storage, in step 305.

The existence of a defect is determined by comparing the node retrieved from the design reference file 231 and the corresponding node in the wave file, in step 304, and when a defect is found (i.e., the "YES" result), the information on the defect is stored in the apparatus for defect storage, in step 305. After the information on the defect has been stored (in step 305), or when no defect is found (i.e., the "NO" result), it is determined whether one or more nodes remain to be compared, in step 306. When one or more nodes remain to be compared (i.e., the "YES" result), all the operations described above are repeated for each of those remaining nodes. If no other nodes remain to be compared (i.e., the "NO" result) then the logic circuit verification stage is complete.

The design defect correction stage 250 corrects design defects using the results of the logic circuit verification stage 230. The results of the logic circuit verification stage 230 are stored in the apparatus for defect storage, so the defect can be easily corrected using the results.

As described above, the logic circuit verification method according to the present invention is employed to verify design defects using the information on the waveforms of all the nodes of the logic circuit, and the waveform information is the same regardless of the type of simulator, solving the conventional problem that the source file must be related to a specific simulator.

The types of verification performed in the method and apparatus for verification of the logic circuit will now be described. A computer-based system having at least one processor and storage device can serve as a platform for providing the functions herein described. The functions can be implemented in hardware, firmware, software, or a combination thereof and can form part of the computer based system, as a logic circuit verification system or apparatus.

As described above, the method and the apparatus for verification of the logic circuit verify the functional, timing, and analog characteristics of the logic circuit, and therefore the description will follow that order.

Commands that can be included in the design reference file 231 will now be described, as illustrative examples. In other embodiments, the commands could take a different form.

First, for checking whether or not the values of each node of the logic circuit increase by one at every rising edge of a clock signal, the following commands can be included:
    increment (var=Address[17:6],
    val=1,
    clock=clk,
    reset=rst)

Second, for checking whether or not all the nodes of the logic circuit are decoded correctly by a binary decoder, the following commands can be included:
    decoder (in=TOP.IO.AddressIn[3:1],
    out=TOP.IO.AddressOut[7:0],
    clock=clk,
    reset=rst)

Now, the verification of a timing defect will be described.

Third, for checking whether the signals of each node of the logic circuit satisfy minimal values of a specified setup time and hold time, the following commands can be included:
    setup_hold(in =TOP.IO.Data[0],
    min_tsu=2n,
    min_thd=3n,
    clock=clk,
    reset=rst)

Fourth, for checking whether or not the signals of each node of the logic circuit are within a specified maximal value of propagation delay time, the following commands can be included:
    prop_delay(in=TOP.inv0.A,
    out=TOP.inv0.Y,
    max_tplh=1.5n,
    max_tplh=1.5n,
    clock=clk,
    reset=rst)

Finally, the verification of the analog characteristics of each node of the logic circuit will be described.

Fifth, for checking whether duration time of any node's unknown state is within a maximal value, commands as follows are included.

max_unknown(in=invin,
    max_Tun=0.5n)

FIG. 4 is a table showing comparative data resulting from the application of the conventional logic circuit verification method and the logic circuit verification method according to aspects of the present invention.

FIG. 4 illustrates a simulation result of two logic circuit blocks COM3 and IL, which are included in a memory device. The time for the simulation for each method is indicated in the "TIME TAKEN" column, with the conventional logic circuit verification method indicated as "Oin" and the logic circuit verification method according to aspects of the present invention indicated as "ADV." And the performance of the present method relative to the conventional method is indicated in the "INCREASE OF SPEED" column. As is shown in FIG. 4, the simulation time taken for block COM3 using the conventional logic circuit verification method was 19.5 hours, while the method in accordance with aspects of the present invention was 1.8 hours, which is less than a tenth of the conventional time, even though other values do not show much differences. And as shown for block IL, the conventional logic circuit verification method was 24 hours, while the method in accordance with aspects of the present invention was again 1.8 hours. Thus, for block IL, the method in accordance with aspects of the present invention was about 13.3 times faster than the conventional method.

As described above, the logic circuit verification method according to aspects the present invention can verify circuits more quickly, and has the added advantage that it can be applied for designing general circuits as well as logic circuits, since limitations of simulator do not exist.

While the present invention has been particularly shown and described with reference to exemplary embodiments thereof, it will be understood by those skilled in the art that various changes in form and detail may be made therein without departing from the spirit and scope of the present invention as defined by the appended claims. The exemplary embodiments should be considered in a descriptive sense only, and not for purposes of limitation. Therefore, the scope of the invention is defined not by the detailed description of the invention, but by the appended claims, and all differences within the scope will be construed as being included in the present invention.

What is claimed is:

1. A computer program on a non-transitory computer-readable medium, said computer program causing said computer to perform a logic circuit verification method, comprising:
    using an apparatus configured to verify the logic circuit, generating a wave file using a source file representing the logic circuit, the wave file including waveforms of each node of the logic circuit, wherein the source file can take the form of an HDL code, a gate-level net-list, and a SPICE net-list; and
    also using the apparatus configured to verify the logic circuit, verifying the logic circuit using a design reference file and the wave file, the design reference file including ideal operations to be implemented for each node of the logic circuit,
    wherein the verifying includes determining whether there is a waveform corresponding to each signal node in the logic circuit, and if there is a mismatch of a waveform corresponding to each node in the logic circuit, indicating a defect or a malfunction.

2. The verification method of claim 1, wherein the generating of the wave file comprises:
    generating the source file; and outputting information on waveforms of each node of the logic circuit that are included in the source file.

3. The verification method of claim 1, wherein the verifying of the logic circuit comprises comparing each of the nodes included in the design reference file with a corresponding node included in the wave file, and storing a result of the comparison in an apparatus for defect storage.

4. The verification method of claim 3, wherein the verifying of the logic circuit comprises:
   reading the design reference file;
   determining whether or not a node of the logic circuit from the design reference file corresponds to a node in the wave file;
   retrieving information on a waveform of the corresponding node from the wave file, when there the corresponding node exists in the wave file;
   determining the occurrence of a defect by comparing each node that has been retrieved from the design reference file with the corresponding node in the wave file;
   saving the defect in a storage device when the node that has been retrieved from the reference file does not correspond to a node in the wave file, or when a defect is found based on the result of the comparison;
   determining whether or not at least one node remains to be compared, when a defect is found and saved or no defect has been found based on the comparison result; and
   repeating all the operations above when a node remains to be compared.

5. The verification method of claim 1, wherein the verifying of the logic circuit comprises verifying functional, timing, and analog characteristics of all of the nodes of the logic circuit.

6. The verification method of claim 5,
   wherein the verifying of the functional characteristics of a node in the logic circuit includes determining whether or not logical values at a predetermined point in time are within an allowed range specified by the design reference file,
   wherein the verifying of the timing characteristics of the node in the logic circuit includes determining whether or not a setup time, a hold time, and a propagation time of a signal are within allowed ranges specified by the design reference file, and
   wherein the verifying of the analog characteristics of the node in the logic circuit includes determining whether or not a duration time of the nodes' unknown state is within an allowed range specified by the design reference file.

7. The verification method of claim 1, wherein when the verifying of the logic circuit results in determining a defect in a design of the logic circuit, the method further comprises correcting the defect of the design in the logic circuit.

8. A computer program on a non-transitory computer-readable medium, said computer program causing said computer to perform a logic circuit verification method, comprising:
   using an apparatus configured to verify a logic circuit, verifying functional, timing, and analog characteristics of each node of the logic circuit using waveforms resulting from a simulation of each node of the logic circuit and representations of ideal operations of each node of the logic circuit,
   wherein the verifying of the functional characteristics of a node in the logic circuit includes determining whether or not logical values at a predetermined point in time are within an allowed range specified by the design reference file,
   wherein the verifying of the timing characteristics of the node in the logic circuit includes determining whether or not a setup time, a hold time, and a propagation time of a signal are within allowed ranges specified by the design reference file, and
   wherein the verifying of the analog characteristics of the node in the logic circuit includes determining whether or not a duration time of the nodes' unknown state is within an allowed range specified by the design reference file.

9. The method of claim 8, wherein the verifying includes determining whether there is a waveform corresponding to each node in the logic circuit, and in the absence of a waveform corresponding to each node in the logic circuit, indicating a defect.

10. The method of claim 8, wherein the waveforms are stored in a wave file and the ideal operations of each node are stored in a design reference file.

11. The method of claim 10, wherein the verifying comprises comparing information from the wave file with information from the design reference file.

12. An apparatus for verifying a logic circuit, configured to verify a logic circuit design by comparing waveform characteristics of each node of the logic circuit design with ideal operations of corresponding nodes of a logic circuit design,
   wherein the apparatus is configured to verify functional, timing, and analog signal characteristics of the logic circuit using the waveform characteristics of each node of the logic circuit,
   wherein the verifying of the functional characteristics in the node of the logic circuit includes determining whether or not logical values at a predetermined time are within an allowable range when compared to the design reference file,
   wherein the verifying of the timing characteristics of the node in the logic circuit includes determining whether or not a setup time, a hold time, and a propagation time of a signal are within allowed ranges specified by the design reference file, and
   wherein the verifying of the analog characteristics of the node in the logic circuit includes determining whether or not a duration time of the nodes' unknown state is within an allowed range specified by the design reference file.

13. The apparatus of claim 12, wherein the waveform characteristics are generated from a source file comprising one of HDL code, a gate-level net-list, and a SPICE net-list.

14. An apparatus for verifying a logic circuit design, comprising:
   a wave file generation stage configured to generate a source file representing the logic circuit design and to generate a wave file from the source file, the wave file comprising waveforms corresponding to nodes of the logic circuit design; and
   a logic circuit verification stage configured to verify the logic circuit design by comparing the waveforms corresponding to each of the nodes of the logic circuit design with a design reference file representing an ideal operation of each of the nodes of the logic circuit design,
   wherein the logic circuit verification stage is configured to verify functional, timing, and analog signal characteristics of the logic circuit design using waveform characteristics in the wave file for each node of the logic circuit design,
   wherein the verifying of the functional characteristics of a node in the logic circuit includes determining whether or not logical values at a predetermined point in time are within an allowed range specified by the design reference file,
   wherein the verifying of the timing characteristics of the node in the logic circuit includes determining whether or not a setup time, a hold time, and a propagation time of a signal are within allowed ranges specified by the design reference file, and wherein the verifying of the analog characteristics of the node in the logic circuit includes determining whether or not a duration time of the nodes' unknown state is within an allowed range specified by the design reference file.

15. The apparatus of claim 14, further comprising:
a defect correction stage configured to correct defects in the logic circuit design detected during the verifying by the logic circuit verification stage.

16. The apparatus of claim 14, wherein the logic circuit verification stage is configured to verify the logic circuit by comparing information in the wave file with information the reference design file.

17. The apparatus of claim 14, wherein the source file is one of HDL code, a gate-level net-list, and a SPICE net-list.

18. A computer program on a non-transitory computer-readable medium, said computer program causing said computer to perform a logic circuit verification method, comprising:

using an apparatus for verifying a logic circuit, verifying functional, timing, and analog characteristics of each node of a logic circuit using waveforms resulting from a simulation of each node of the logic circuit and representations of ideal operations of each node of the logic circuit, wherein the verifying includes determining whether there is a waveform corresponding to each node in the logic circuit, and in the absence of a waveform corresponding to each node in the logic circuit, indicating a defect.

* * * * *